United States Patent
Takeuchi

(10) Patent No.: US 10,652,847 B2
(45) Date of Patent: May 12, 2020

(54) SIMULCAST CONTROLLER, RELAY STATION, AND COMMUNICATION METHOD OPERATED ON SIMULCASTING

(71) Applicant: JVC KENWOOD Corporation, Yokohama-shi, Kanagawa (JP)

(72) Inventor: Takashi Takeuchi, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 45 days.

(21) Appl. No.: 16/140,742

(22) Filed: Sep. 25, 2018

(65) Prior Publication Data
US 2019/0098593 A1 Mar. 28, 2019

(30) Foreign Application Priority Data

Sep. 25, 2017 (JP) .................. 2017-183788
Jun. 28, 2018 (JP) .................. 2018-123149

(51) Int. Cl.
*H04W 56/00* (2009.01)
*H04B 7/155* (2006.01)
*H04B 7/26* (2006.01)
*H04B 7/15* (2006.01)

(52) U.S. Cl.
CPC ...... *H04W 56/003* (2013.01); *H04B 7/15528* (2013.01); *H04W 56/004* (2013.01); *H04W 56/0055* (2013.01); *H04B 7/15* (2013.01); *H04B 7/2606* (2013.01)

(58) Field of Classification Search
None
See application file for complete search history.

(56) References Cited

U.S. PATENT DOCUMENTS

| | | | |
|---|---|---|---|
| 5,867,488 A | 2/1999 | Derango et al. | |
| 2001/0017849 A1* | 8/2001 | Campanella | H04B 7/18526 370/326 |
| 2003/0161290 A1* | 8/2003 | Jesse | H04W 84/00 370/338 |
| 2011/0268018 A1* | 11/2011 | Wang | H04W 56/002 370/328 |
| 2013/0223550 A1* | 8/2013 | Fimoff | H04L 1/0045 375/261 |
| 2014/0273916 A1* | 9/2014 | Roy | H04B 7/15507 455/404.1 |
| 2018/0115478 A1* | 4/2018 | Kim | H04L 43/106 |
| 2018/0287688 A1* | 10/2018 | Otsu | H04B 7/14 |

* cited by examiner

*Primary Examiner* — Mohammad S Adhami
(74) *Attorney, Agent, or Firm* — Brundidge & Stanger, P.C.

(57) ABSTRACT

A relay station comprising: a time server that supplies time-synchronized pulse data generated every second; and a symbol counter that counts symbol periods used in communication, based on the pulse data. The relay station transfers an upstream signal to a simulcast controller, by including in the upstream signal a first count value of the symbol counter that indicates a timing when synchronization with the upstream signal is established. The simulcast controller calculates a second count value based on the first count value to indicate a timing of transmission of the downstream signal from the relay station to the terminal device, transfers the downstream signal for transmission from the relay station to the terminal device, with the second count value being included in the downstream signal. The relay station starts transmitting the downstream signal based on the second count value.

5 Claims, 9 Drawing Sheets

SIMULCAST CONTROLLER, RELAY STATION, AND COMMUNICATION METHOD OPERATED ON SIMULCASTING

CROSS-REFERENCE TO RELATED APPLICATION

This application is based upon and claims the benefit of priority from the prior Japanese Patent Application No. 2017-183788, filed on Sep. 25, 2017, and Japanese Patent Application No. 2018-123149, filed on Jun. 28, 2018, the entire contents of which are incorporated herein by reference.

BACKGROUND

1. Field

The present invention relates to communication technology and to a simulcast controller, relay station, and communication method operated according to a simulcast scheme.

2. Description of the Related Art

A simulcast wireless communication system is a wireless system that covers an extensive area by allowing a plurality of sites to transmit the same frequency. To ensure an extensive cover area, radio waves from the respective sites need be synchronized. For this reason, the sites in the system are time synchronized and are capable of transmitting at the same time. For example, time data called a time stamp message is used to enable simultaneous transmission from the sites (U.S. Pat. No. 5,867,488).

[patent document 1] U.S. Pat. No. 5,867,488

In U.S. Pat. No. 5,867,488, received data (inbound data) is transferred to a time stamp server via a network. The time stamp server transfers packet data that includes outbound transmission start time calculated based on the time of received inbound data to the respective sites via the network. The site controller of each site starts transmission in accordance with the outbound transmission start time. The system allows time management using a single device (time stamp server) but has a demerit in that the time server need be provided and the system becomes complicated accordingly.

In making transmission to a terminal device located at a position where it can receive signals from a plurality of sites in a simulcast system, a time difference in radio propagation from respective sites need be allowed for so that interference may be caused in simultaneous transmission as taught in the prior art document.

SUMMARY

A relay station according to an embodiment is a relay station in a wireless communication system for wireless communication according to simulcast scheme where an upstream signal received from a terminal device is transmitted from a plurality of relay stations as a downstream signal, and the relay station comprising: a time server that supplies time-synchronized pulse data generated every second; a symbol counter that counts symbol periods used in communication, based on the pulse data; a wireless communication unit that performs wireless communication with the terminal device; and a network communication unit that transfers the upstream signal to a simulcast controller, including in the upstream signal a first count value of the symbol counter that indicates a timing when synchronization with the upstream signal is established, and that receives, from the simulcast controller, a downstream signal for transmission from the relay station to the terminal device, with a second count value, calculated based on the first count value to indicate a timing of transmission of the downstream signal from the relay station to the terminal device, being included in the downstream signal, wherein the wireless communication unit starts transmitting the downstream signal based on the second count value.

Another embodiment relates to a communication method. A communication method, whereby a plurality of relay stations relay communication between terminal devices according to a simulcast scheme, is characterized by including: counting, using the plurality of relay stations, symbol periods used in communication, based on a timing of time-synchronized pulse data generated every second; receiving, using one of the relay stations, an upstream signal from a terminal device; determining a first count value, which is a count value of symbol periods, indicating a timing of synchronization with the upstream signal; transferring the upstream signal to the simulcast controller, by including the first count value in the upstream signal; calculating a second count value, which is a count value of symbol periods, indicating a timing of a downstream signal for transmission from the relay stations to the terminal device, based on the first count value included in the upstream signal; transferring, using the simulcast controller, the downstream signal to the plurality of relay stations, by including the second count value in the downstream signal; and starting, by using the relay stations, transmitting the downstream signal at a timing based on the second count value.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Figure 1:
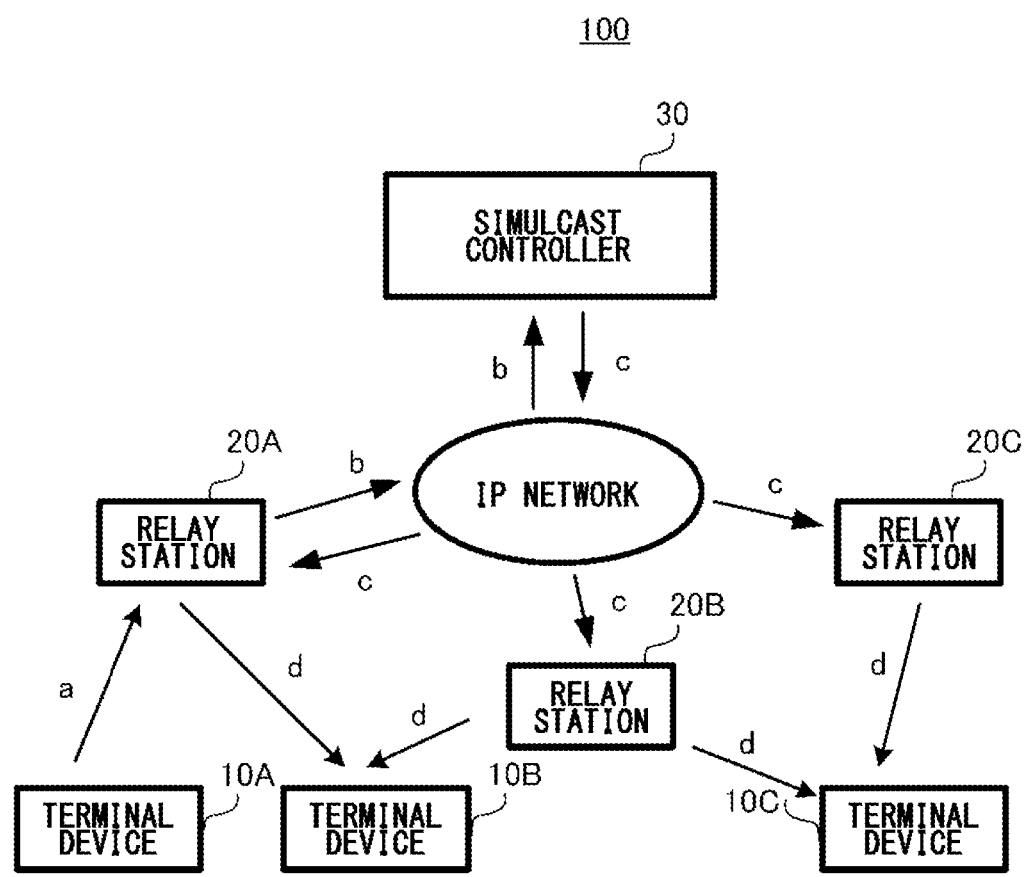
FIG. 1 shows a configuration of a wireless communication system according to an embodiment.

FIG. 1 shows a configuration of a wireless communication system 100 according to an embodiment. The wireless communication system 100 includes a plurality of terminal devices 10 (10A, 10B, 10C), a plurality of relay stations 20 (20A, 20B, 20C), and a simulcast controller 30. The number of terminal devices 10 is arbitrary, and the number of relay stations 20 is also arbitrary.

The terminal device 10 is a half-duplex wireless communication apparatus. The NXDN Very Narrow system will be described by way of example of the wireless digital protocol of the wireless communication apparatus. The relay station 20 is a facility that includes a repeater of the NXDN Very Narrow system described above and relays signals of the terminal device 10.

The simulcast controller 30 is connected to the plurality of relay stations 20 via an IP network.

FIG. 1 is used to show a flow of a signal for communication according to a simulcast scheme. Arrows a-d in the figure denote directions of communication. A description will be given of a case where a signal transmitted from the terminal device 10A is received by the terminal device 10B and the terminal device 10C, using the simulcast scheme.
a: The signal (upstream signal) transmitted from the terminal device 10A is received by the relay station 20A.
b: The upstream signal received by the relay station 20A is sent to the simulcast controller 30 via the IP network.
c: The simulcast controller 30 generates a downstream signal for synchronized transmission of the upstream signal from the relay stations 20 and transfers the downstream signal to the relay stations 20.
d: The relay stations 20 makes a transmission based on the transmission timing included in the downstream signal transferred from the simulcast controller 30, and the terminal devices 10 receive the downstream signal thus transmitted when they can receive the signal.

Figure 2:
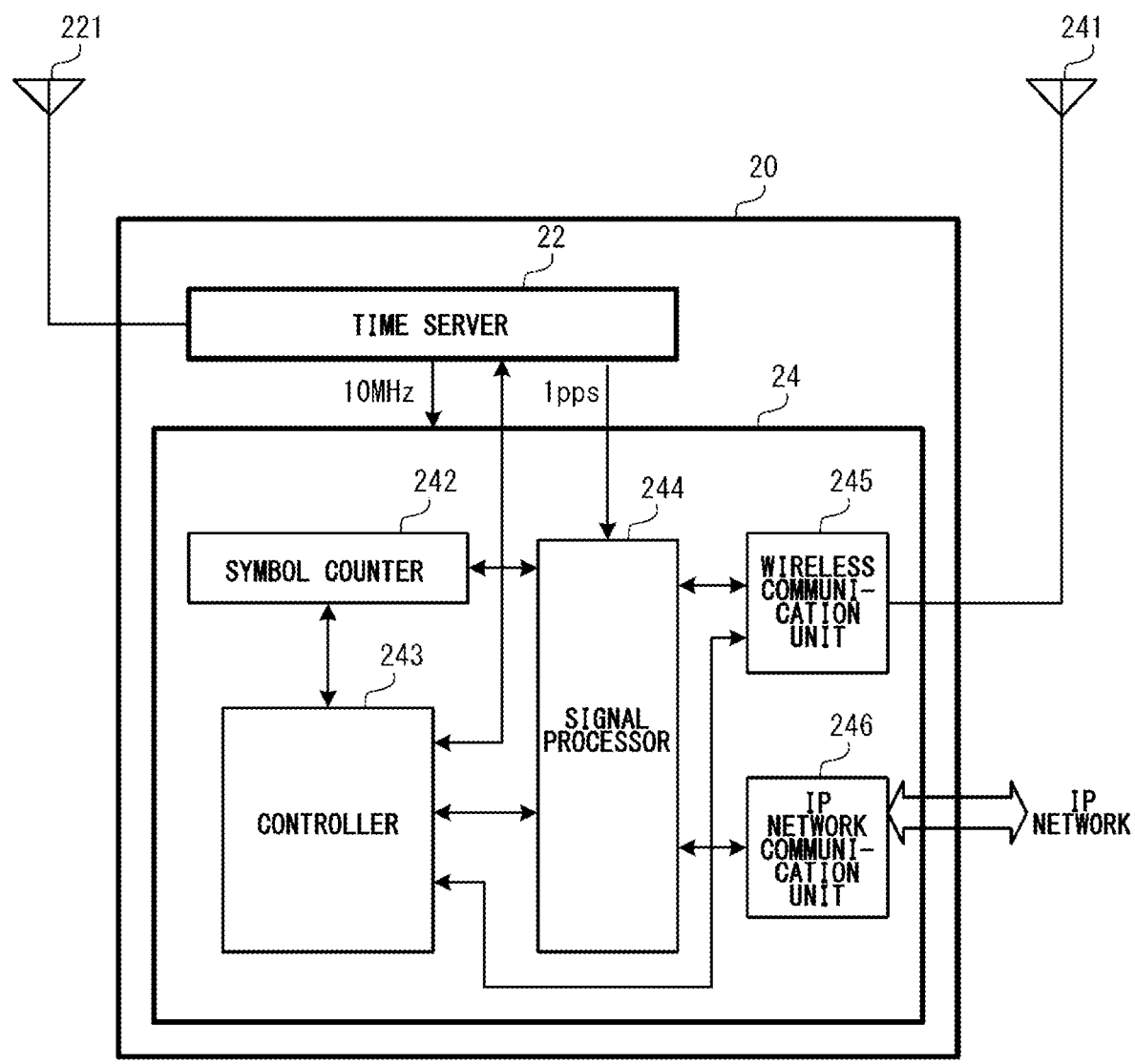
FIG. 2 shows a configuration of the relay station 20 of FIG. 1.

FIG. 2 shows a configuration of the relay station 20. The relay station 20 includes a repeater (repeater 24) and a Global Positioning System (GPS) reference apparatus (time server 22) for establishing time synchronization based on a signal from a GPS satellite, etc. The repeater 24 includes a symbol counter 242, a Host (controller 243), a DSP (signal processing unit 244), a wireless communication unit 245, and an IP network communication unit 246.

A description will now be given of the operation of the relay station 20 at startup with reference to FIG. 2. The time server 22 of the relay station 20 is in time and frequency synchronization with the GPS based on the GPS signal received by a GPS antenna 221 and outputs a 1pps signal and a 10 MHz reference signal to the repeater 24. The 1 pps signal is a pulse signal synchronized with every second of time. When the repeater 24 is started, the controller 243 in the repeater 24 inquires the time server 22 for the time. In response to the inquiry, the time server 22 notifies the controller 243 of the repeater 24 accordingly. The controller 243 refers to the time and notifies the signal processor 244 of the repeater 24 whether the 1 pps signal indicates an odd second or an even second.

Figure 3:
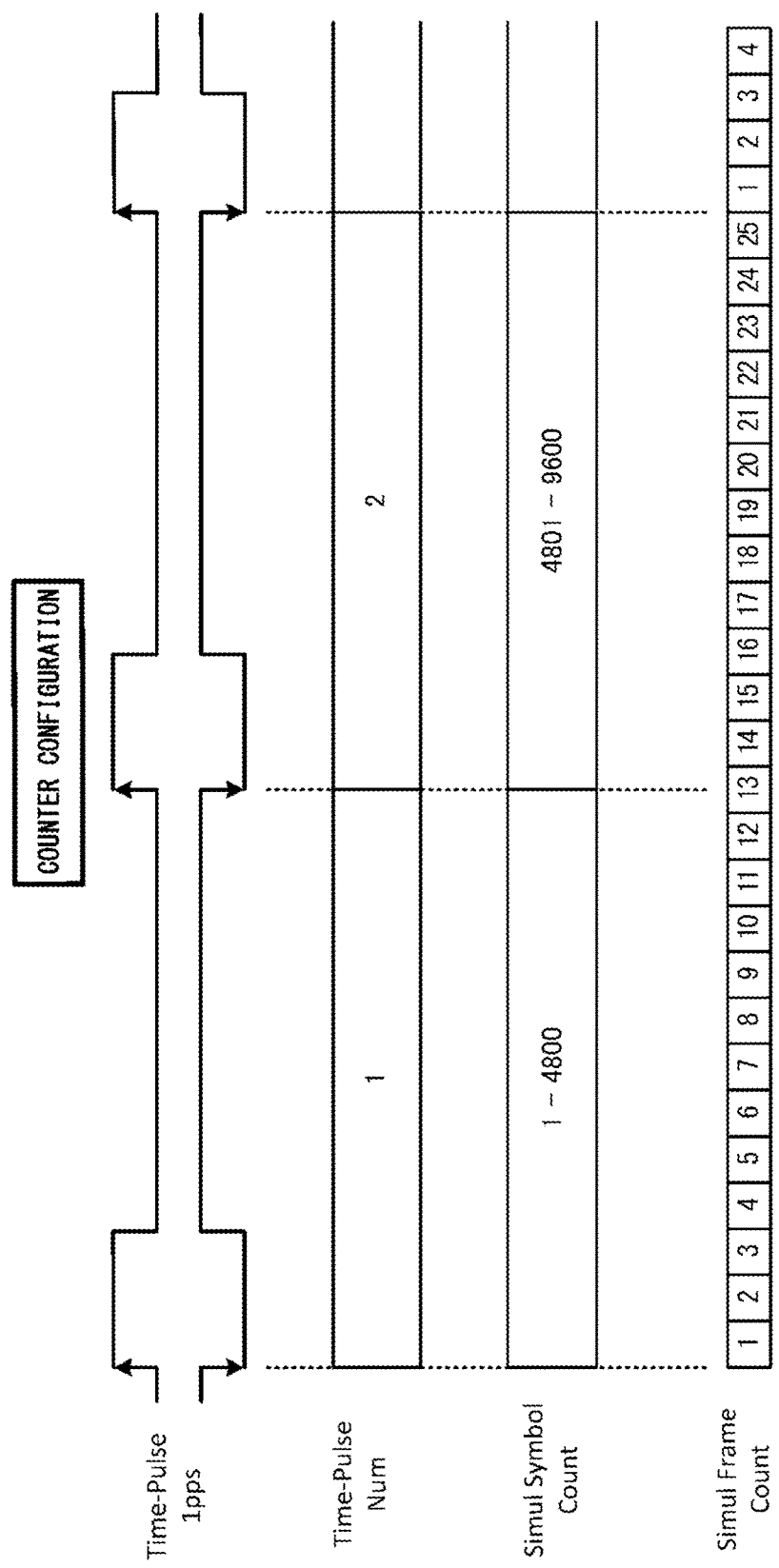
FIG. 3 shows a relationship of count values of a symbol counter.

FIG. 3 shows a simul symbol count and a simul frame count based on a time-pulse number of the 1 pps signal communicated from the time server 22 and indicating an odd second or an even second. The wireless digital protocol of the NXDN system is taken as an example. Therefore, there are 4800 symbols/sec and 12.5 frames/sec, and the time is divisible by the number of frames at a period of 2 seconds. As regards the symbol count value, FIG. 3 shows that the 1st through 4800-th symbols are counted during an odd second, and the 4801-th through 9600-th symbols are counted during an even second. As regards the frame number indicating the frame count value, FIG. 3 shows that start of the odd second is aligned with 1, and the end of the even second is aligned with 25. In the case of other wireless digital protocols, periods may be counted at an interval according to the symbol rate and the frame rate of that wireless digital protocol. If 1 second is divisible by the number of frames, distinction between odd seconds and even seconds is not necessary.

The signal processor 244 sets the count values of the counters configured as shown in FIG. 3 in the symbol counter 242 and starts counting accordingly. FIG. 3 shows that the symbol counter 242 aligns the rising edge of the 1 pps signal for an odd second with the start of the symbol count and the frame count. In case there is a need to provide a time difference (delay) in the relay stations 20 as described later, the start of the symbol count and the frame number count may be offset from the rising edge of the 1 pps signal when the relay station 20 is started.

A description will now be given of how a signal transmitted from the terminal device 10 (upstream signal) is processed in the relay station 20. The repeater 24 of the relay station 20 receives the signal transmitted by the terminal device 10 by using the antenna 241. The wireless communication unit 245 of the repeater 24 feeds the signal received by the antenna 241 to the signal processor 244. The signal processor 244 subjects the received signal to symbol synchronization and frame synchronization.

Figure 4:
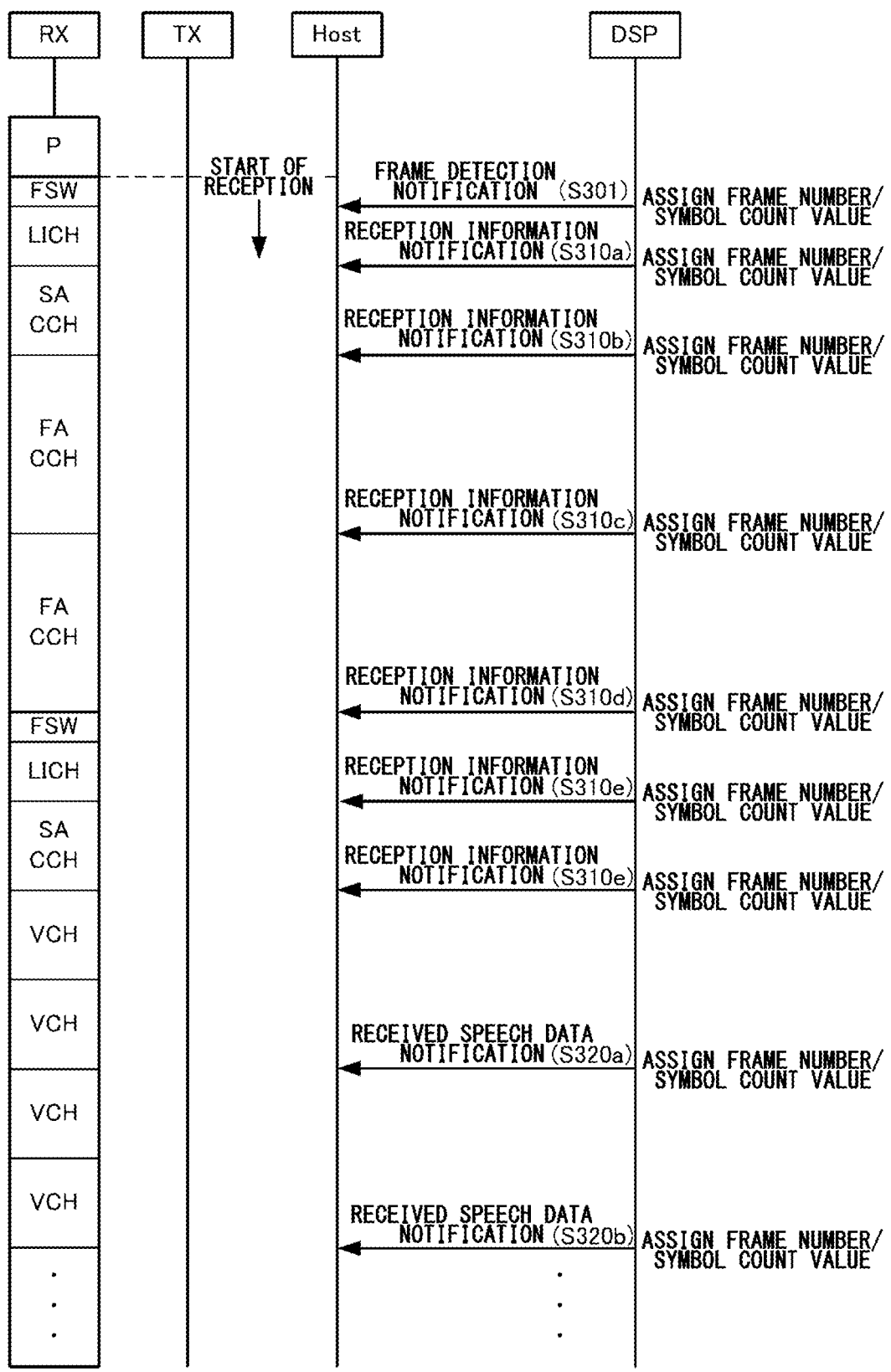
FIG. 4 shows a message sequence between DSP and Host in response to received signal.

FIG. 4 shows a message sequence between the signal processor 244 (DSP) and the controller 243 (Host) in response to the received signal (RX) transmitted from the terminal device 10 and received by the relay station 20. "P" at the beginning of the received signal denotes a preword "P" provided to precede a synchronization word "FSW" only when communication is started to facilitate detection of the start of reception. The preword "P" facilitates establishment of symbol synchronization. The preword "P" also facilitates frame synchronization established after symbol synchronization by detecting the synchronization word "FSW". The signal processor 244 receives the synchronization word "FSW". When synchronization is detected, the signal processor 244 outputs a frame detection notification (S301) to the controller 243. The notification signal includes the symbol count value and the frame number of FIG. 3.

Further, the signal processor 244 demodulates the received signal and outputs reception information notifications (S310a-S310e) to the controller 243 in accordance with the logical channels of the demodulated received data. These notification signals also include the simul symbol count value and the simul frame count number. Similarly, received speech data notifications (S320a-S320b) also include the simul symbol count value and the simul frame count number. If it is possible to manage the simulcast operation only by using the symbol count value, only the symbol count value may be communicated.

The controller 243 receiving a frame detection notification signal outputs received data including various notification signals to the simulcast controller 30 via the IP network.

Figure 5:
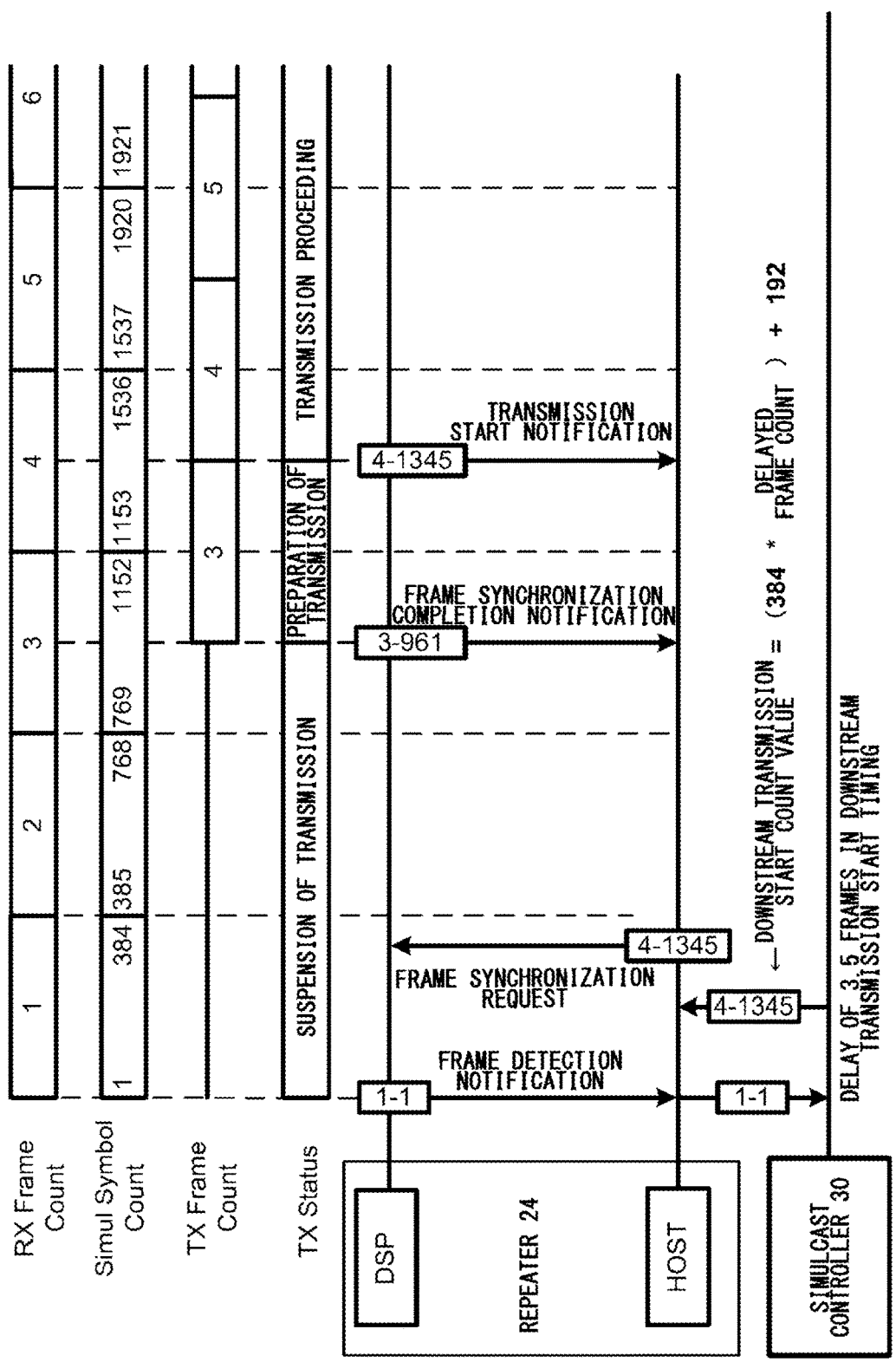
FIG. 5 shows a relationship related to a timing for transmission of received data from the relay station.

FIG. 5 shows a relationship related to the timing for transmission of received data from the relay station 20. The simulcast controller 30 refers to the symbol count value included in the frame detection notification signal output from the relay station 20 to calculate the timing (downstream start timing) to transmit a downstream signal from the relay station 20. FIG. 5 uses a notation "1-1" to denote a case where the frame number is "1" and the symbol count value is "1" when frame synchronization of the received signal is detected. In this embodiment, calculation is made to start downstream transmission after 3.5 frames. The simulcast controller 30 transfers "4-1345" (the frame number is "4", and the symbol count value is "1345") indicating the downstream start timing 3.5 frames after, to all relay stations 20 in the system via the IP network. As described already, if the operation can be managed only by the symbol count value, the downstream start timing may be set only by using the symbol count value. The controller 243 of the repeater 24 receiving the downstream start timing notifies the signal processor 244 of the downstream start timing in the form of a frame synchronization request.

Figure 6:
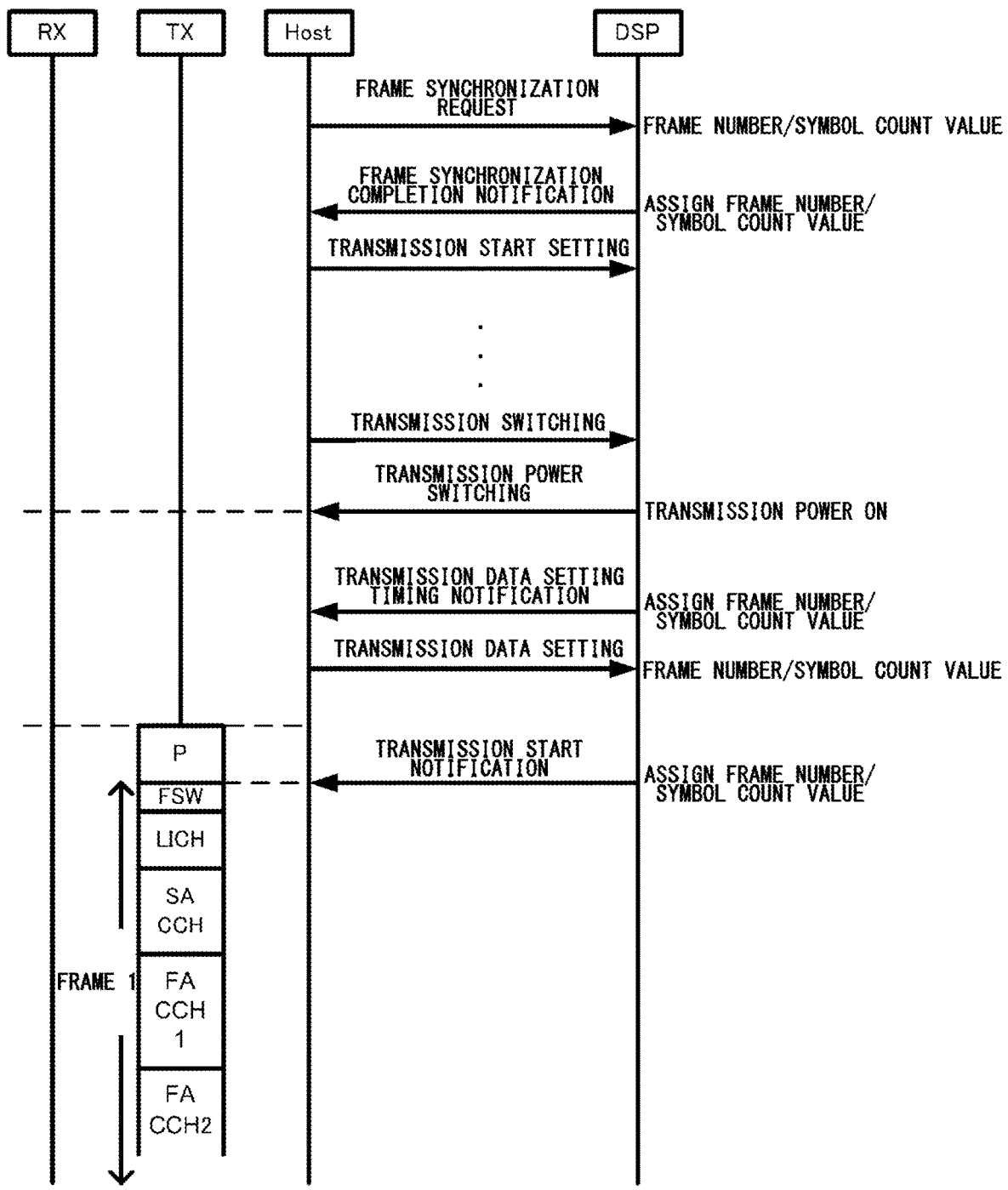
FIG. 6 shows a message sequence between DSP and Host the repeater 24 receiving a frame synchronization request.

FIG. 6 shows a message sequence between the signal processor 244 (DSP) of the repeater 24 receiving the frame synchronization request and the controller 243 (Host). The signal processor 244 receiving the frame synchronization request outputs a frame synchronization completion notification signal to the controller 243 one frame before the transmission start timing, i.e., at the timing "3-961" shown in FIG. 5 defined by the frame number "3" and the symbol count "961". The frame synchronization completion notification signal is assumed to be output one frame before in this embodiment but may be output at an arbitrary point of time provided that no problem is posed for synchronization.

Reference is made back to FIG. 6. The controller 243 receiving the frame synchronization completion signal outputs various configuration signals to the signal processor 244 to start downstream transmission. The signal processor 244 outputs a transmission power supply switching signal, a transmission data configuration timing notification signal, etc. in time for the transmission start timing communicated in the form of the frame synchronization request. The controller 243 receiving the transmission data configuration timing notification signal performs transmission data setting by setting transmission data in the signal processor 244. The data thus set represents data for downstream transmission (downstream data). The signal processor 244 starts transmitting the downstream signal, by aligning the downstream data received in the transmission data setting with the count value designated in the frame synchronization request. Management of these steps using the counters enables simultaneous transmission of the downstream signal from the relay stations (respective sites).

The symbol counter 242 continues to repeat the count unless the repeater 24 is restarted and inquires the time server 22 of the time. The communication system keeps track of the upstream reception timing based on the count value of the symbol counter, calculates the downstream transmission timing, and starts downstream transmission in accordance with the calculated count value. Further, the inventive system eliminates the need to inquire the time server 22 for the time unless the repeater 24 is restarted. Thus, the embodiment provides a simulcast wireless communication system of a simple system configuration.

The above-described wireless communication system according to the simulcast scheme is a useful means to prevent interference between sites in the presence of signals transmitted from a plurality of sites and received by the terminal device, provided that the impact of radio propagation from the sites is small.

That the impact of radio propagation from the sites is small means that the transmission power output from the sites is relatively small and the distance of radio propagation is small. When the distance of radio propagation is small, interference due to the delay in radio propagation from the sites is substantially negligible even if the terminal device is located at a position where it can receive signals from a plurality of sites. Further, even if the transmission power from the sites is relatively high, the distances of radio propagation from the sites will be similar to each other provided that the transmission power is similar between the sites. It can be said that interference due to the delay is small in this case.

The impact of radio propagation from the sites is large when the transmission power output from the sites is relatively high, the distance of radio propagation is large (e.g., 10-100 km), and the sites differ in the transmission power. In other words, the impact is large when the sites differ in the distance of radio propagation.

In business wireless systems, the transmission power of the wireless communication unit 245 of the relay station 20 provided in each site is relatively high (e.g., 50 W). Therefore, the distance at which the terminal device 10 can receive the signal transmitted by the relay station 20 at a practical reception level (hereinafter, referred to as a cell radius) is 10-100 km, which could be a distance subject to interference in the case that signals are received from a plurality of sties.

If the transmission output of a site and that of an adjacent site are identical, the impact of radio propagation is little even if the terminal device is at a position where it can receive signals from the adjacent sites.

While it is ideal to arrange the relay stations to have cell radii of a similar scale, ideal arrangement of relay stations (cell arrangement) is often difficult due to an impact from the geography, etc. There are also cases where a site having a small cell radius and covering a small area is provided adjacent to an area of a large cell radius with the development of a town. In other words, the relay station is arranged to cover a necessary area, and the transmission power thereof is configured to cover the necessary area.

Figure 7:
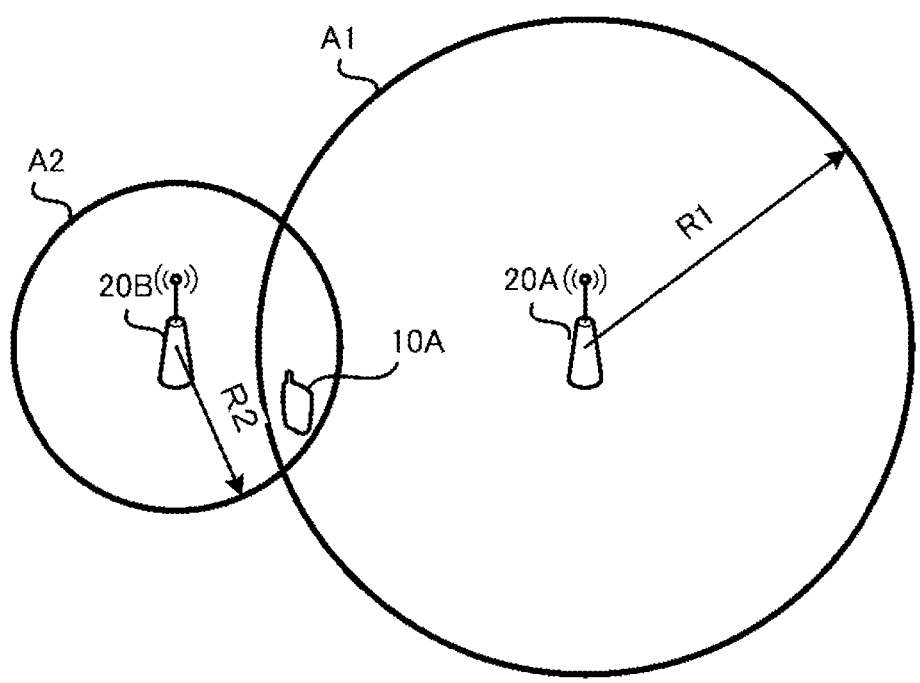
FIG. 7 shows an area map defined when the cell radii of a plurality of relay stations 20 differ.

FIG. 7 shows an exemplary area map covered when the cell radii of relay stations differ. FIG. 7 shows that two relay stations 20A and 20B are arranged. The area of the relay station 20A is denoted by area A1, and the area of the relay station 20B is denoted by area A2. The terminal device 10A is located in an area in which area A1 and area A2 overlap.

The relay stations 20 are arranged to cover necessary areas, and the transmission power thereof is configured to cover necessary areas. In the case of FIG. 7, area A1 covered by the relay station 20A is relatively large, and area A2 covered by the relay station 20B is smaller than area A1.

For example, it will be assumed that the cell radius R1 of area A1 is 20 km, and the cell radius R2 of area A2 is 10 km. Since the electric field intensity is inversely proportional to the square of the distance, a transmission output of 0.25 times is necessary to obtain the same electric field intensity at a propagation distance of 0.5 times. The transmission output from the relay station 20B to cover area A2 will be 25% the transmission output of the relay station 20A.

When the cell radii of adjacent relay stations 20 differ, i.e., when the transmission power of the wireless communication unit 245 of the relay station 20 differs from that of the adjacent relay station 20, and when terminal device 10A is at a position where it can receive signals from both relay stations, the terminal device theoretically receives the same electrical field intensity from the relation stations, but interference is caused because radio waves from a farther relay station are delayed.

Radio waves propagate at the light speed. Given that the light speed is 300,000 km/S, a period of time of about 66.6 μS is necessary to prepare a distance of 20 km, and a period of time of about 33.3 μS is necessary to propagate a distance of 10 km. Therefore, given that the terminal device 10 is at a position where it can receive signals from both the relay station 20A and the relay station 20B, the terminal device 10 will be receiving signals such that the signal from the relay station 20A is delayed by 33.3 µS, which represents a difference in radio propagation, relative to the signal from the relay station 20B. Even when two signals are identical and have the same electric field intensity, the two signals inter if a difference in radio propagation is caused between the signals, resulting in lower quality of received signals.

Figure 8:
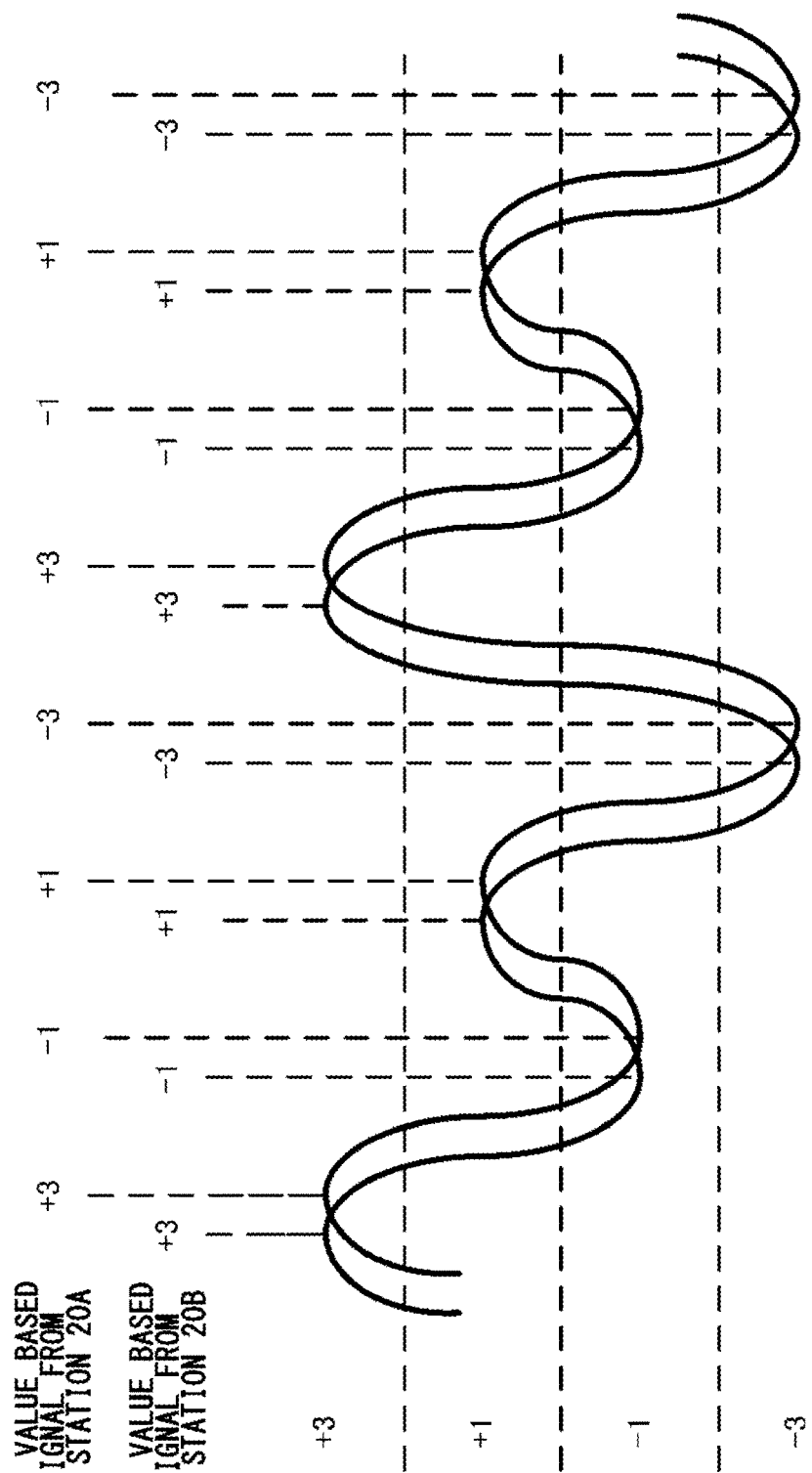
FIG. 8 shows that inter-symbol interference is caused.

FIG. 8 shows waveforms of signals transmitted simultaneously from the relay stations 20A and 20B and received and modulated by the terminal device 10A. FIG. 8 shows examples of waveforms occurring when the quaternary FSK modulation scheme is used for communication and the terminal device 10A subjects the modulated signal to FM demodulation. It can be said that quaternary symbol values (−3, −1, +1, +3) detected from the demodulated waveforms define the symbol timing. Given that the symbol rate is 4800 symbols/sec mentioned above, the duration of one symbol is about 208 µs. Given the duration (208 µS) of one symbol, a time difference (33.3 µS) required for signals from two base stations to arrive due to propagation delay causes the demodulated waveforms to interfere, making it impossible to define the symbol timing. Further, the delay time (33.3 µS) represents 10% or more of the duration (208 µS) of one symbol, which is not a negligible value, meaning that intersymbol interference is caused. Intersymbol interference like this is an unfavorable phenomenon in which symbols that precede and follow act as a kind of noise. The quality of received signals is lowered so that the reliability of communication is lowered accordingly.

To address this, the propagation time in an area bordering surrounding areas may be measured when a relay station is newly installed. At startup of the relay station, an offset time from the rising edge of the 1 pps signal may be defined based on the measured time before starting the symbol count and the frame count.

Figure 9:
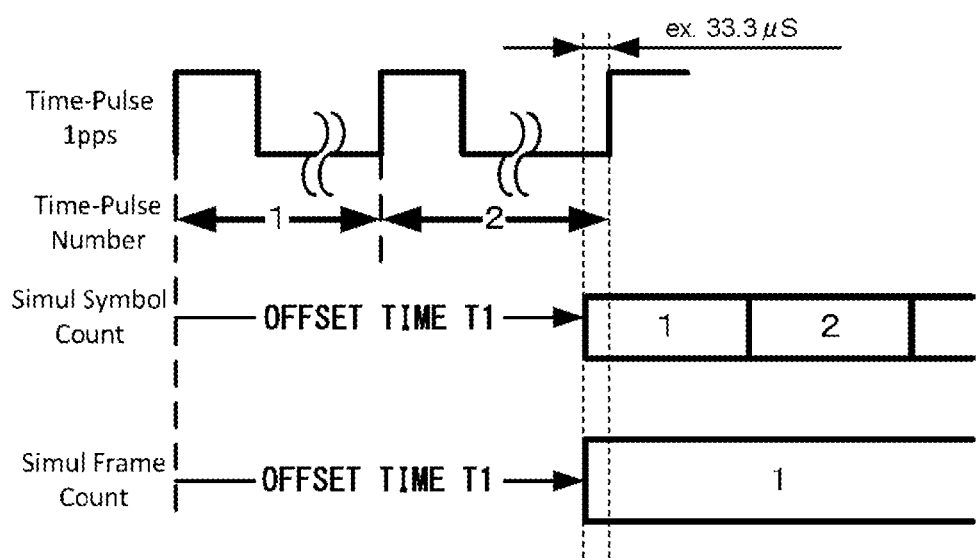
FIG. 9 shows a case where an offset time is defined in the symbol count of the relay station 20.

FIG. 9 shows a case where the relay station 20B of FIG. 7 defines an offset time and starts the symbol count accordingly. In the case of the embodiment, the start of an odd second is used as a reference. The symbol count cannot be started before the start of the first odd second. Therefore, an offset of 33.3 µS, which represents the duration of delay, is provided before the next rising edge of the odd second and the symbol count is started accordingly. In other words, an offset of 2S−33 µS=1.9999667 S is provided, and the symbol count is started accordingly.

After the repeater 24 is started, the controller 243 inquires the time server 22 for the time. The controller 243 refers to the time obtained from the time server 22 and starts the symbol count after an offset time T1 has elapsed since the rising edge of an odd second. In the case of the embodiment, T1 is 1.9999667 S. Similarly, the controller 243 starts counting the frame value after the offset time T1. Since the relay station is hardly moved once it is installed, the offset time need not be changed unless the transmission power of the relay station is changed.

Thus, it is possible to configure the transmission timing in the wireless communication system in such a manner that a time difference in radio propagation is allowed for. Further, the simulcast controller need not allow for the offset time of the relation stations so that it is possible to provide a simulcast wireless communication system of a simple system configuration.

The embodiment is described as being adapted to the NXDN Very Narrow wireless digital protocol but may be compatible with other wireless digital protocols.

What is claimed is:

1. A simulcast controller that controls an upstream signal transmitted from a terminal device and received by a relay station to be transmitted as a downstream signal from a plurality of relay stations including the relay station receiving the upstream signal, comprising:
   a network interface that receives a transferred upstream signal including a count value indicating a timing when synchronization with the upstream signal is established, the count value being that of a symbol counter provided in the relay station to count symbol periods based on time-synchronized pulse data generated every second; and
   a transmission signal generator that calculates a symbol timing indicating time when the downstream signal should be transmitted, based on the count value, and generates the downstream signal that includes a calculated symbol value, wherein
   the network interface transfers the downstream signal that includes information on the calculated symbol value to the plurality of relay stations.

2. A relay station of a wireless communication system for wireless communication according to a simulcast scheme, adapted to transmit an upstream signal received from a terminal device as a downstream signal from a plurality of relay stations, wherein
   the relay station comprising:
   a time server that supplies time-synchronized pulse data generated every second;
   a symbol counter that counts symbol periods used in communication, based on the pulse data;
   a wireless communication unit that performs wireless communication with the terminal device;
   a network communication unit that transfers the upstream signal to the simulcast controller, including in the upstream signal a first count value of the symbol counter that indicates a timing when synchronization with the upstream signal is established, and that receives, from the simulcast controller, a downstream signal for transmission from the relay station to the terminal device, with a second count value, calculated based on the first count value to indicate a timing of transmission of the downstream signal from the relay station to the terminal device, being included in the downstream signal, wherein
   the wireless communication unit starts transmitting the downstream signal based on the second count value.

3. The relay station according to claim 2, wherein the symbol counter provides an offset time defined based on a timing of the pulse data before starting the count.

4. The relay station according to claim 2, wherein the offset time is time defined to reduce interference that occurs when the terminal device located at a position where the terminal device can receive a downstream signal from a plurality of relay stations receives the downstream signal from the plurality of relay stations.

5. A communication method whereby a plurality of relay stations relay communication between terminal devices according to a simulcast scheme, comprising:
   counting, using the plurality of relay stations, symbol periods used in communication, based on a timing of time-synchronized pulse data generated every second;
   receiving, using one of the relay stations, an upstream signal from a terminal device;
   determining a first count value, which is a count value of symbol periods, indicating a timing of synchronization with the upstream signal;

transferring the upstream signal to the simulcast controller, by including the first count value in the upstream signal;

calculating a second count value, which is a count value of symbol periods, indicating a timing of a downstream signal for transmission from the relay stations to the terminal device, based on the first count value included in the upstream signal;

transferring, using the simulcast controller, the downstream signal to the plurality of relay stations, by including the second count value in the downstream signal; and starting, by using the relay stations, transmitting the downstream signal at a timing based on the second count value.

* * * * *